C. BRITT.
AUTOMATIC TRANSMISSION CONTROLLING MECHANISM.
APPLICATION FILED APR. 12, 1916.

1,230,856.

Patented June 26, 1917.

Fig. 1.

Inventor
Charles Britt.

By
, Attorneys

UNITED STATES PATENT OFFICE.

CHARLES BRITT, OF ALGONA, IOWA.

AUTOMATIC TRANSMISSION-CONTROLLING MECHANISM.

1,230,856.  Specification of Letters Patent.  Patented June 26, 1917.

Application filed April 12, 1916. Serial No. 90,714.

*To all whom it may concern:*

Be it known that I, CHARLES BRITT, a citizen of the United States, residing at Algona, in the county of Kossuth and State of Iowa, have invented certain new and useful Improvements in Automatic Transmission-Controlling Mechanisms, of which the following is a specification.

My invention relates to new and useful Improvements in transmission gearings and more particularly to gear shifting mechanisms therefor, the primary object of my invention being the provision of a gear shifting mechanism by means of which the gears may be shifted, for all speed changes, other than the initial speeds of low and reverse, automatically.

In this connection I provide a gear shifting mechanism by means of which the gears of the transmission gearing may be manually shifted into low or reverse speed and by means of which, as soon as the vehicle has acquired proper speeds, the gears will be successively shifted into intermediate and high speed positions.

A further object of my invention consists not only in providing a gear shifting mechanism which will automatically shift from lower to higher speed gear settings, but also one which, if the speed of the vehicle falls below that proper for the speed drive for which the transmission gearing is set, will automatically shift the transmission gearing to a lower speed setting.

In addition to the above described gear shifting mechanism proper, I have a still further object in view, namely, the provision of a clutch actuating mechanism which is operated by the gear shifting mechanism to release and throw in the clutch at the proper time to permit suitable shifting of the gears.

In this connection, a still further object of my invention consists in providing means actuated and controlled by the clutch operating mechanism for automatically locking and unlocking the gear shifting mechanism to hold the gears in selected position or to permit their automatic return to neutral position prior to the setting of the transmission gearing for a different speed drive.

Another object which I have in view is the arrangement of the automatic gear shifting mechanism in such a manner that it will have no effect upon the transmission gearing, irrespective of the speed at which the engine is driven, when the transmission gearing is in neutral position, and in such a manner that it will have no effect upon the transmission gearing, irrespective of either the engine speed or vehicle speed when the transmission gearing is in reverse drive position.

Another object which I aim to accomplish is the provision of a simple and efficient means operable from a point adjacent the driver's seat for adjustably varying the vehicle speeds at which automatic shifting of the transmission gearing from one speed setting to another will be accomplished.

With these and other objects in view, my invention will be more fully described, illustrated in the accompanying drawings, and then specifically pointed out in the claims which are attached to and form a part of this application.

In the drawings.

Corresponding and like parts are referred to in the following description and indicated in all the views of the drawings by the same reference characters.

In order to insure a clear and complete understanding of my invention, its application and method of operation, I have illustrated it in connection with a conventional type of transmission gearing arranged to transmit power at three different speeds forward and one speed reverse. As will be later apparent, however, my gear shifting mechanism is capable of application to transmission gearings of many types and I therefore reserve the right to make any changes in details, such as may be necessary to adapt it to transmission gearings of different styles.

Figure 1:
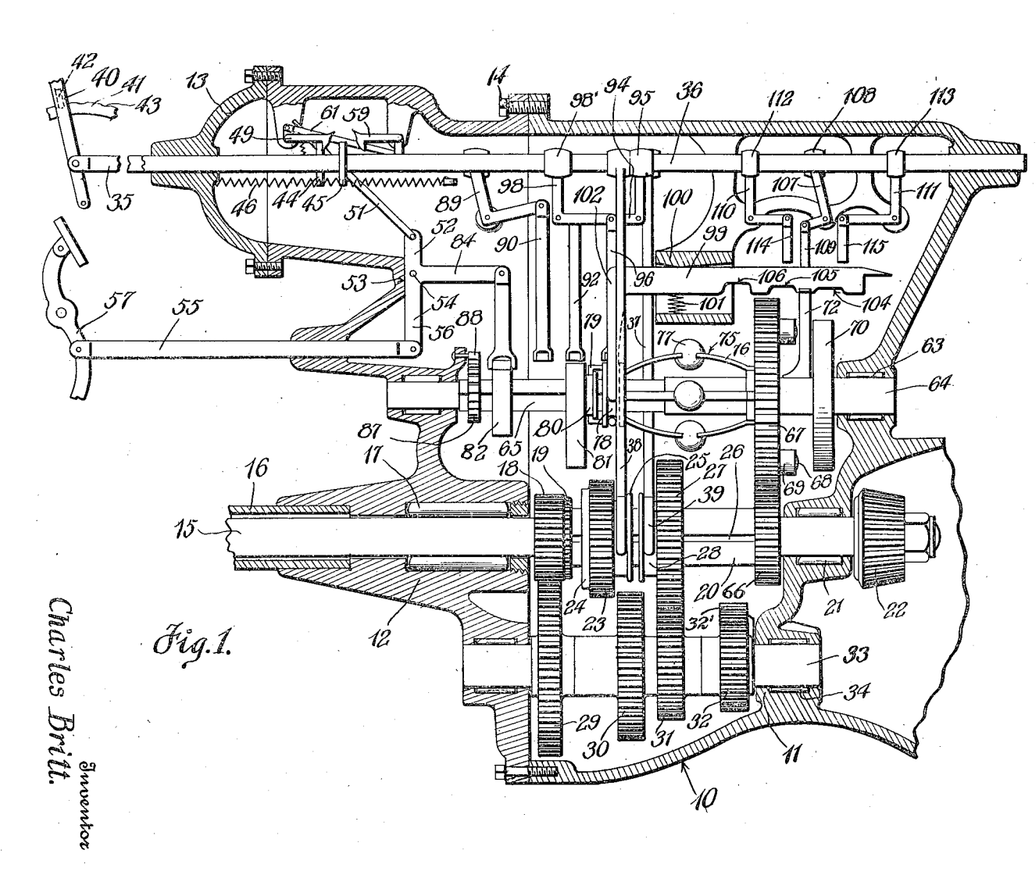
Figure 1 is a central vertical longitudinal sectional view through a conventional form of transmission gearing, showing my invention applied thereto.

The transmission gearing illustrated in Fig. 1 is inclosed in a housing 10 including a rear housing 11 adapted to connect and communicate with the differential housing of a motor vehicle and a forward housing or face plate 12 adapted to close the main housing 11 and provided at its upper portion with an opening in turn closed by a second face plate 13, the various parts of the housing being secured by bolts 14 passed through mating flanges. The drive shaft 15 leads rearwardly from the vehicle clutch through its tubular housing 16 and into the gear casing 10, being preferably supported in the face plate 12 of such casing by roller bearings 17 and carrying, at its inner or rear end, a spur pinion 18 having the rear portions of its teeth mutilated, as shown at 19, to form clutch teeth. The main shaft 20 of the transmission mechanism extends in axial alinement with the drive shaft 15, being journaled in suitable bearings 21 and at its rear end carries the beveled drive pinion 22 of the differential mechanism, not shown. This shaft 20 carries a spur gear 23 having a recessed clutch member 24 adapted to lockingly engage the mutilated teeth 19 of the pinion 18 and the shifter collar 25 grooved to receive a gear shifting lever by means of which the gear 23 may be reciprocated on the shaft 20 to which it is secured by a key 26. In like manner, the shaft 20 carries a second spur gear 27 having the gear shifting collar 28. Co-acting with the above gears and pinions are the gears 29, 30, 31 and 32 which are all fixed to a countershaft 33 journaled in suitable bearings 34. The pinion 18 is fixed to the drive shaft 15 and is constantly in mesh with the spur gear 29 which constitutes the drive gear of the countershaft 33, the result being that all of the gears of this shaft 33 are continually driven when the engine is running. The gear 23 of the shaft 20 is movable forwardly into locking engagement with the pinion 18 to secure a direct or high speed drive of the shaft 20 and movable rearwardly into mesh with the gear 30 of the countershaft to secure an intermediate speed drive. The gear 27 is in like manner movable forwardly into the gear 31 of the countershaft for a low speed drive and rearwardly into mesh with an idler gear 32' constantly meshing with the gear 32 of the countershaft for a reverse speed drive.

Reciprocally mounted in parallel spaced relation and above the transmission gearing, above described, are gear shifting rods 35 and 36 which carry the shifter arms 37 and 38, respectively, terminating in yokes 39 engaging about the collars 25 and 28 of the sliding gears 23 and 27, the rod 35, when reciprocated, shifting the gear 27, and the rod 36, when reciprocated, shifting the gear 23. Ordinarily, with the type of transmission above described, these gear shifting rods would be connected either directly or indirectly with a selector lever by means of which either rod could be manually reciprocated in either direction to bring the transmission gearing into the speed drive desired. In my invention, however, the gear shifting rod 35 is alone connected either directly or by a link to the intermediate portion of a gear shifting lever 40 which is pivotally mounted at its lower end to swing along an arcuate guide 41 and which is preferably provided with a spring pressed ball latch 42 for engagement in one or the other of seats 43 formed in the rack. Obviously, when this lever is swung forwardly, it will act through the shifter rod 35 to bring the gear 27 into mesh with the gear 31, which is the low speed setting of the transmission gearing, and when swung rearwardly will bring the gear 27 into mesh with the idler gear, not shown, which meshes with the gear 32, which is the reverse speed setting of the gearing. In intermediate position of the lever, the gear 27 will likewise occupy an intermediate position and there will be no power transmitted from the shaft 15 to the shaft 20 unless the transmission mechanism is in either second or high speed positions.

To facilitate the moving of the various transmission gears to neutral position, the shifter rods 35 and 36 are provided with locking collars 44 and 45 and secured to opposite sides of each locking collar are helical springs 46 which, at their free ends, are connected to the casing or any suitable fixed support in such a manner that the springs of each pair act against each other to hold the shifter rods in intermediate position. Means, which will now be described, is provided for engagement with the locking collars 44 and 45, under suitable circumstances, to hold the shifter rods in other positions against the action of their springs. This locking mechanism includes a rock shaft 47 extending transversely and at right angles to the shifter rods and journaled in suitable bearings and carrying at its ends locking hooks 48 and 49 adapted to engage over the locking collars 44 and 45 when the control or shifter rod of either collar is moved to its extreme forward position. This shaft 47 is formed intermediate its length with an upstanding crank arm 50 having a trip finger 50' and a spring 50" normally holds the shaft in active position. A plunger 51 engages the crank arm and is pivoted to one arm 52 of a T-shaped bell crank lever 53 which is pivotally supported, as shown at 54. Swinging of this lever will cause the plunger to turn the rock shaft until the plunger is tripped by the finger 50' when the spring 50'' will return the shaft to normal position.

A link 55 connects the opposite arm 56 of this lever 53 with the clutch lever 57 of the vehicle in such a manner that when the clutch is thrown out, by means of the clutch lever in the usual manner, the link 55 will be forced rearwardly to act through the lever 53 and plunger 51 to rock the shaft 47 and raise its hooks 48 and 49 out of engagement with whatever locking collars they may have been holding. A second rock shaft 58 is mounted in parallel spaced relation to the rock shaft 47 and carries at one end a hook 59 for engagement with the collar 45 of the shifter rod 36 when such rod is in its extreme rearward position. This rock shaft 58 has a crank arm 60 and a link 61 pivotally connects this crank arm with a crank arm 61' so that the rock shafts 47 and 58 are reversely oscillated by swinging of the lever 53. The forward faces of the hooks 48, 49 and 59 are formed at an inclination, as shown at 62, in order that they may ride over the collars 44 and 45 during movement of the shifter rods 35 and 36 away from normal position.

Journaled in alined bearings 63 is a shaft 64 which is circular in cross section throughout a portion of its length and squared or otherwise formed with angular faces throughout another portion of its length, as shown at 65. A spur pinion 66 is fixed upon the shaft 20 and meshes with a spur gear 67 idly mounted upon the cylindrical portion of the shaft 64 but held against longitudinal movement thereon. This spur gear at diametrically opposite points, is provided with laterally projecting pins 68 which carry rollers 69 projecting in spaced relation to a trip disk 70 keyed or otherwise secured upon the shaft 64 to rotate therewith. Pivotally mounted upon a pin 71 projecting from an eccentric portion of this disk 70 is a trip lever 72 having a counterweighted or enlarged head 73 adapted, in one position of the disk, to hold the free arm of the lever in substantially vertical position, as shown, and having an impact face 74 adapted, when the free arm of the lever is swung downwardly, to be engaged by one or the other of the rollers 69, whereby the disk and shaft 64 will be rotated through turning of the gears 67.

The gear 67 constitutes the driven member of a governor mechanism, indicated as a whole by the numeral 75, leaf springs 76 carrying intermediate their length the governor weights 77, being connected at one end to the hub of the gear 67 and at their opposite end to a grooved collar 78 free for both rotary and longitudinal movement along the squared portion 65 of the shaft 64. This collar, at its outer face, is formed with fingers 79 which engage the grooved hub portion 80 of a cam 81 which is mounted upon the squared portion 65 of the shaft 64 for longitudinal movement thereon, but which rotates with the shaft 64. By this means, a swiveled connection between the collar 78 and cam 81 is provided. This cam is in the form of a disk eccentrically mounted with respect to the shaft and, as will be later pointed out, constitutes the actuating means proper for shifting the transmission gearing. A second cam 82 is fixed against both longitudinal and independent turning movement upon the squared portion of the shaft 64 and is in the form of a disk having a portion of its peripheral face cut-away, as at 82, whereby the remaining portion of its peripheral face forms, with respect to the face 83, a cam face. A T-shaped lever 53 has an arm 84 extended into spaced relation over the cam 82 and a plunger 85 is pivoted to the free end of this arm 84 and at its lower end carries a roller 86 engageable with the peripheral face of the cam 82. Under normal conditions, that is when the roller 86 engages the flattened face 83 of the cam, the clutch will be in active position and the locking hooks 48, 49 and 59 will be in lowered position. Any turning of the shaft 64 will cause the cam 82 to act through the plunger 85 to swing the lever 84 and throw the clutch to inactive position and swing the locking hooks upwardly away from locking collars with which they may have been engaged. A ratchet wheel 87 is fixed upon the squared portion of the shaft and a pawl 88 is constantly held in engagement with this ratchet wheel, by gravity, to prevent counter rotation of the shaft 64.

Figure 2:
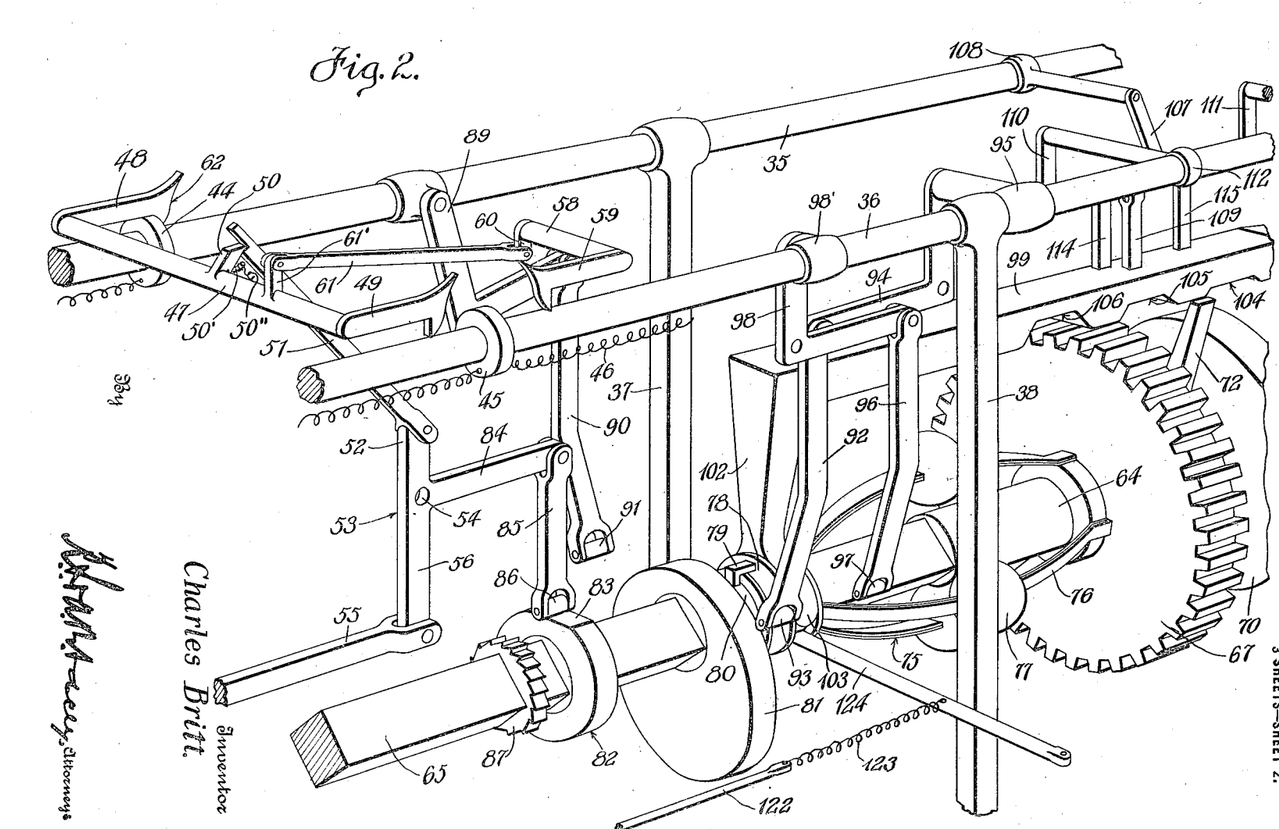
Fig. 2 is a fragmentary perspective view of the gear shifting mechanism proper, no attempt being there made to illustrate any of the bearings or supports for the various levers, shafts and rods, in order that the vital elements of the mechanism may be as clearly disclosed as possible.
Figures 3, 4:
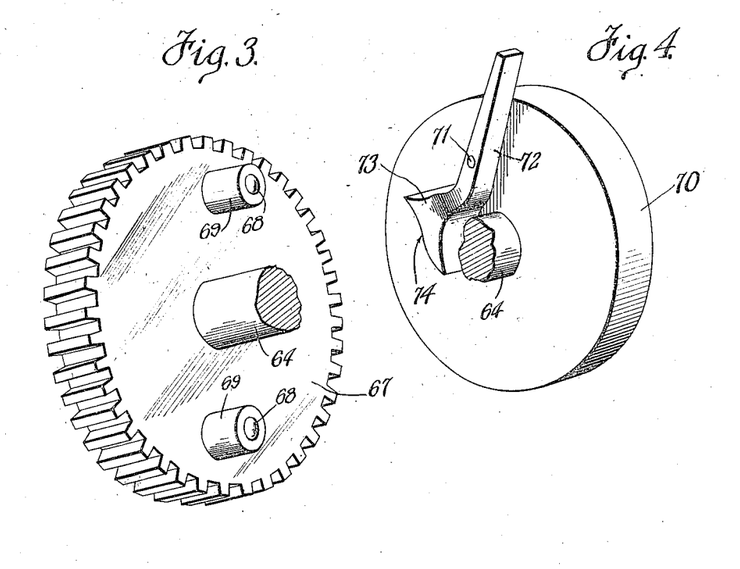
Fig. 3 is a perspective view of a governor driving gear which also serves as the driving means for the gear shifting mechanism.
Fig. 4 is a similar view of the trip lever and its supporting member by which power is transmitted from the gear shown in Fig. 3 to the gear shifting mechanism.

A bell crank lever 89 is pivotally supported by the casing member 12 with one arm extending substantially vertically and operatively connected to the shifter rod 35. A plunger 90 is pivoted to the substantially horizontally extending arm of the lever 89 and at its free end carries a roller 91 which, in one position of the cam 81, longitudinally of its shaft, will be engageable by the cam to force the bell crank lever 89 in such a direction as to move the shifter rod 35 forwardly to the position shown in Fig. 2. A second plunger 92 depends in spaced relation to the plunger 90 and carries a roller 93 engageable with the cam 81 upon further movement of the cam toward the gear 67. This plunger 92 is supported by the horizontally extending arm of a bell crank lever 94 which is pivoted upon the casing 11 and which, at its other end, has operative connection with the collar 95 fixed upon the shifter rod 36. The horizontal arm of this bell crank lever 94 extends in a direction opposite to that of the bell crank lever 89, with the result that when its plunger 92 is raised by the cam 81, the shifter rod 36 will be forced rearwardly to such a position that its locking collar 45 may be engaged by the hook 59. A plunger 96 is disposed in parallel spaced relation to the plunger 92 and carries, at its lower end, a roller 97 engageable by the cam 81 when the latter has moved still nearer the gear 67 and this plunger is supported upon the horizontally extending arm of a bell crank lever 98 having operative connection with a collar 98' fixed upon the shifter rod 36. The horizontal arm of the lever 98 extends opposite to that of the lever 94 so that actuation of its plunger by the cam 81 will cause a forward movement of the shifter rod 36 until its collar 45 is engaged by the hook 49.

I will now describe the means which I employ for throwing the trip lever 72 at times when the vehicle speed is such that a change of gear setting is proper. This means includes a shifting slide 99 in the form of a bar reciprocally mounted in a sleeve 100 formed within the casing 10 and so proportioned that the slide 99 is also free for limited vertical movement, being normally held in elevated position by a spring 101 engaging between it and the lower portion of the sleeve. This slide 99 at one end is provided with a depending arm 102 terminating in fingers 103 to engage the collar 78 of the governor 75 in such a manner that reciprocation of the slide will be caused through movement of the governor. This slide has its lower face provided at spaced intervals with elongated notches or seats 104, 105 and 106 providing resultant shoulders having rounded edges, as shown. Under normal conditions, that is when the transmission gearing is in neutral position, the spring 101 will support the slide in such a manner that it may move longitudinally in unison with the governor collar 78 without in any way affecting the trip lever 72. On the other hand, if the slide is held in lowered position, against the action of the spring, any reciprocation of the slide bringing the shoulder into engagement with the outwardly directed end of the lever 72 will swing such lever to bring its head or impact receiving face 74 into the path of movement of the rollers 69 of the governor gear 67.

A bell crank locking lever 107 is pivoted within the casing and operatively engages at one end with a collar 108 carried by the shifter rod 35. A plunger 109, connected to the free arm of this lever, extends in such a position that a forward movement of the shifter rod 35 to place the transmission gears in low speed position will cause a depression of the plunger to force the slide 99 into position such that its shoulders may engage the trip lever. In like maner, bell crank locking levers 110 and 111 are pivotally supported within the casing and have operative connection with collars 112 and 113 carried by the shifter rod 36. Plungers 114 and 115 are connected to the free arms of these levers and are movable by forward and rearward movement of the shifter rod 36, respectively, into locking engagement with the slide 99 to lock the slide in lowered position in either second or high speed settings of the transmission gearing. It should be noted that no provision is made for locking the slide in lowered position either when the transmission gearing is in neutral or when it is in reverse position, all of the plungers, in either of these positions, being elevated.

Mounted at any point convenient to the driver, such as upon the steering column 116 of the vehicle, is a shaft 117 which may be journaled in brackets 118. One end of the shaft carries hand lever 119 movable over a notched sector 120 and the other end of the shaft terminates in a laterally directed arm 121. A link 122 is connected at one end to the free end of the arm 121 and at its opposite end to a helical spring 123 connected to the intermediate portion of a lever 124. This lever is pivotally supported at one end for swinging movement in a horizontal plane and at its other end engages the grooved collar 78 of the governor. It will, therefore, be clear that by proper manipulation of the hand lever 119, the spring 123 may be tensioned to vary the speed at which the governor 75 must be driven to cause a predetermined amount of movement of its collar 78 along the shaft 64. That is, the mechanism may be set so that the governor will operate at any desired vehicle speeds and this setting may be controlled from the steering wheel.

Having thus described my invention, I will now explain its operation. I will first assume that the gear shifting lever 40 is in neutral position, that is, with its latch in engagement with the intermediate seat 43 of the sector 41. Under these conditions, both of the control rods 35 and 36 will be in intermediate position, their collars being out of engagement with the various locking hooks described. I will also assume that the clutch is in and the engine running idly. Under these conditions, no power is transmitted to the shaft 20 and, consequently, the governor is not driven and the engine may be driven at any speed without in the slightest degree affecting the transmission mechanism or its controlling mechanism. To start the vehicle, the clutch is thrown out, in the usual manner, which also raises the plunger 85 out of engagement with the clutch operating cam 82 and which also acts through the bell crank lever 53 and various connecting links to momentarily swing all the locking hooks 48, 49 and 59 into raised position. With the clutch still thrown out, the gear shifting lever 40 is then moved to its extreme forward position, which is that shown in Fig. 1, causing a forward movement of the shifter rod 35 to bring its locking collar 44 beyond the hook 48 and to bring the gear 27 of the transmission gearing into mesh with the gear 31 so that power may be transmitted from the shaft 15 through the shaft 33 to the shaft 20 and so to the rear axle of the vehicle. This movement of the shifter rod 35 also causes a depression of the plunger 109 and consequent depression of the slide 99, the free end of the trip lever 72 being then located in the seat 104 of the slide. With the gears thus set in low speed position, the clutch is let in in the usual manner. This letting in of the clutch not only connects the shaft 15 with the crank shaft of the engine, so that power will be transmitted to the axle, but also lowers the plunger 85 to bring its roller into engagement with the clutch operating cam 72 and leaves the locking hooks so that the hook 48 engages the locking collar 44 to lock the shifter rod 35 in forward position and to, consequently, lock the transmission gearing in its low speed position.

At the time the above operations are being performed, the gear shifting cam 81 is normally below the plunger 90 as the governor is, of course, not in action until power is transmitted to the rear axle of the vehicle. When the clutch has been let in and the vehicle is started at low speed, the governor is brought into play and its collar 78, together with its gear shifting cam 81, are gradually drawn rearwardly toward the governor gear 67 as the speed of the vehicle increases. When the vehicle speed has increased to such an extent as to bring the gear shifting cam 81 beneath the plunger 92, that is, to the position shown in Fig. 2, the shifter rod has been moved rearwardly to such an extent that that shoulder located between the seats 104 and 105 engages the trip lever 72 to throw it into active position. Under these circumstances, one of the rollers 69 of the driven gear 67 of the governor engages the impact face 74 of the trip lever and, consequently, locks the gear 67 and disk 70 together during such a length of time as will cause one rotation of the shaft 64. This turning of the shaft 64 acts first through the higher speed or more abrupt clutch releasing cam 82 to swing the bell crank lever 84 in such a manner as to simultaneously throw out the clutch and raise the locking lever 48 out of engagement with the locking collar 44 of the control or shifter rod 35. This, of course, releases the shifter rod 35 and permits one of its springs 46 to move the rod to intermediate position and, consequently, to move the gear 27 out of mesh with the gear 31, leaving the transmission gearing in neutral position. Immediately after the throwing out of the clutch in the above manner, the gear shifting cam 81 engages the roller of the plunger 92 and acts through it to move the gear shifter rod 36 rearwardly until its locking collar has passed to the rear of the locking hook 59 and until the gear 23 has been brought into mesh with the gear 30 which is the intermediate speed setting of the transmission gearing. This movement of the shifter rod 36 also causes a depression of the plunger 114 to hold the slide 99 in lowered position, this slide having, of course, been released upon return of the shifter rod 35 to intermediate position. In the meantime, the cam 82 has returned to normal position, again letting in the clutch and the hook 59 engages the collar 45 and hold the transmission gearing in intermediate speed setting. With the vehicle thus proceeding upon intermediate speed as the vehicle speed gradually increases, the cam 81 is moved rearwardly, together with the slide 99 until the cam is beneath the plunger 96 and the trip lever has been thrown by engagement with that shoulder of the slide located between the seats 105 and 106. As a result, the trip lever is engaged by one of the rollers of the governor gear 67 and the shaft 64 is again rotated to cause first a release of the clutch, with the consequent release of the shifter rod 36 and return of the transmission gearing to neutral position, then a shifting of the rod 36 to its forward position to move the transmission gearing into high speed position, and then a return of the clutch and a locking of the slide through the plunger 115. This places the transmission in high speed position and any further increase in vehicle speed will have no effect as the governor is so arranged that it cannot operate to move its collar 78 beyond a certain predetermined point.

If the speed of the vehicle, for any reason, such as an increase in load, due to a steep grade or the like, should fall to such a point that it would be proper to shift the gears to intermediate speed, in order to avoid stalling of the engine, its governor collar will have moved forwardly to bring the cam 81 beneath the plunger 92 and to bring the shoulder between the seats 105 and 106 into engagement with the trip lever 72 to throw such lever to active position. As a result, the shaft 64 will be rotated to release the clutch and return the transmission gearing to neutral position and the cam 81 will act to bring the transmission gearing into intermediate position, after which the clutch cam will come to normal position, let in the clutch and lock the gearing in position. In a corresponding manner, the transmission gearing will, under proper circumstances, be automatically shifted from intermediate speed to low speed.

The operator can, of course, at any time, bring the gears into neutral position by means of the lever 40 and with the vehicle at rest can place the transmission gearing in reverse drive position by means of the lever 40, the automatic controlling mechanism, under this latter circumstance, having no effect as the slide 99 will be held in elevated position by its spring, none of the plungers 109, 114 and 115 being depressed. As a result, any movement of the slide will have no effect upon the trip lever 72 and no shifting of gears will be accomplished. The clutch pedal 57 should be so connected to the clutch and to the link 55 that it may be manually moved a sufficient distance to slip the clutch without acting upon the lever 53 to cause a release of the transmission gearing from any position in which it may be set, this being done only upon a full movement of the clutch pedal either through pressure exerted directly upon the pedal or through the action of the clutch releasing cam 72 and lever 53. It will, therefore, be clear that the vehicle, after once being started, under low speed, will be automatically controlled as far as any gear shifting is concerned, the driver having merely to control the speed of the vehicle by proper manipulation of the throttle lever and slipping of the clutch from time to time or application of the brakes.

Figures 5, 6:
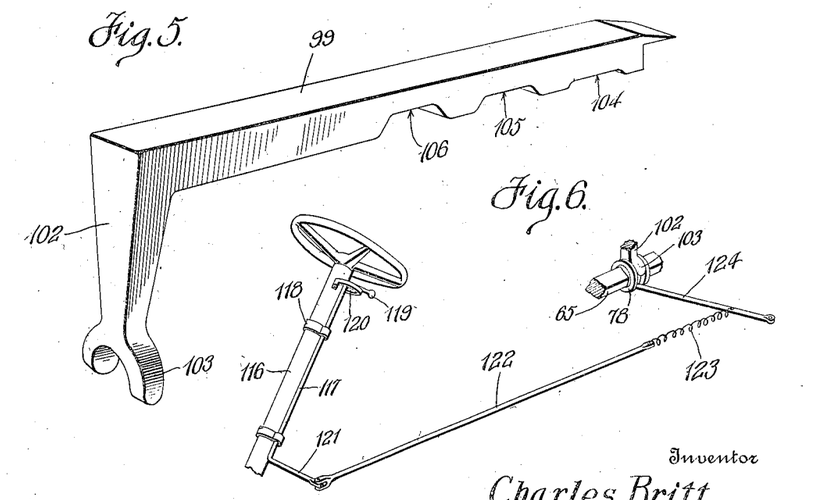
Fig. 5 is a perspective view of the shifting slide employed in operating the trip lever.
Fig. 6 is a diagrammatic perspective view of the means for varying the vehicle speeds at which the transmission gearing will be automatically shifted.

When driving a vehicle through heavy traffic, such as in cities in which the roads are usually good and in which a low speed is necessary, it is advisable that the governor 75 be capable of shifting the gears into high speed at a relatively low vehicle speed, in other words, it is necessary that the governor be somewhat weak. On the other hand, when driving through the country or in hilly country, it is advisable that the gear setting be in high speed only when the vehicle is being driven at a relatively high rate of speed, as for instance, ten or fifteen miles an hour and the strength of the governor should be increased under such circumstances. It is for this purpose that I provide the mechanism previously described and illustrated in Fig. 6, it being clear that a proper swinging of the hand lever 119 may impose added tension upon the spring 123 to cause a retardment of the action of the governor.

Having thus described the invention, what is claimed as new is:

1. In a control mechanism for variable speed transmission gearings, the combination with a variable speed transmission gearing including a driving element, a driven element, and means for imparting power from one to the other at variable speeds, of means controlled by the rate of rotation of the driven element for automatically changing the rate of power transmission from one element to the other, and means independent of the rate of power transmission for varying the speed at which the driven element must rotate to cause operation of the automatic means.

2. A control mechanism for slide gear transmissions including shifter rods, arms extending from the rods and adapted to operatively engage collars of the transmission mechanism to shift the sliding gears thereof, means for manually shifting one of the rods to obtain certain settings of the transmission gearing, and means for automatically returning such rod to normal position and for shifting the other rod to obtain a different speed setting.

3. A control mechanism for slide gear transmissions including shifter rods, arms extending from the rods and adapted to operatively engage collars of the transmission mechanism to shift the sliding gears thereof, means for manually shifting one of the rods to obtain certain settings of the transmission gearing, and means for automatically returning such rod to normal position and for shifting the other rod to obtain a different speed setting, said means operating only when power is being transmitted at a given rate of speed.

4. A control mechanism for slide gear transmissions including shifter rods, arms extending from the rods and adapted to operatively engage collars of the transmission mechanism to shift the sliding gears thereof, means for manually shifting one of the rods to obtain certain settings of the transmission gearing, a governor driven by the driven element of the transmission, and means controlled by the governor for automatically returning such rod to normal position and for shifting the other rod to obtain a different speed setting.

5. A control mechanism for slide gear transmissions including shifter rods, arms extending from the rods and adapted to operatively engage collars of the transmission mechanism to shift the sliding gears thereof, means for manually shifting one of the rods to obtain certain settings of the transmission gearing, a governor driven by the driven element of the transmission, means controlled by the governor for automatically returning such rod to normal position and for shifting the other rod to obtain a different speed setting, and means for varying the strength of the governor, whereby it will operate at different speeds.

6. In a control mechanism for transmission gearing, the combination with a transmission gearing including a drive shaft and driven shaft, a countershaft, gears upon the drive shaft, driven shaft and countershaft for transmitting power at various rates from the drive shaft to the driven shaft, one of the gears being shiftable in one direction to cause a low speed drive, another gear being shiftable in another direction to cause an intermediate speed drive and in the opposite direction to cause a high speed drive, of a governor driven by the driven shaft of the transmission, means controlled from the driver's seat for adjusting the resistivity of the governor, and means controlled by the governor for moving the second shifter rod in either direction dependent upon the speed of the governor.

7. In a control mechanism for transmission gearing, the combination with a transmission gearing including a drive shaft and driven shaft, a countershaft, gears upon the drive shaft, driven shaft and countershaft for transmitting power at various rates from the drive shaft to the driven shaft, one of the gears being shiftable in one direction to cause a low speed drive, another gear being shiftable in another direction to cause an intermediate speed drive and in the opposite direction to cause a high speed drive, of a clutch lever by means of which the driving shaft is operatively engaged and disengaged with the crank shaft of an engine, a governor driven by the driven shaft of the transmission, means controlled from the driver's seat for adjusting the resistivity of the governor, and means controlled by the governor for successively releasing the clutch, returning the transmission to neutral position, moving one of the shifter rods to bring the transmission into another speed position, locking the transmission in such position, and letting in the clutch.

8. In a control mechanism for transmission gearing, the combination with a transmission gearing including a drive shaft and driven shaft, a countershaft, gears upon the drive shaft, driven shaft and countershaft for transmitting power at various rates from the drive shaft to the driven shaft, one of the gears being shiftable in one direction to cause a low speed drive, another gear being shiftable in another direction to cause an intermediate speed drive and in the opposite direction to cause a high speed drive, of a clutch lever by means of which the driving shaft is operatively engaged and disengaged with the crank shaft of an engine, a governor driven by the driven shaft of the transmission, means controlled from the driver's seat for adjusting the resistivity of the governor, and means controlled by the governor for successively releasing the clutch, returning the transmission to neutral position, moving one of the shifter rods to bring the transmission into another speed position, locking the transmission in such position, and letting in the clutch, the speed so selected by the governor being a higher or lower speed than that for which the transmission was previously set dependent upon an increase or decrease in governor speed.

9. In a control mechanism for variable speed transmission gearings, the combination with a variable speed transmission gearing, and means for manually shifting the gearing into low and reverse speed positions, of means for automatically shifting the gearing to other speed positions, said latter means being governed by the load imposed upon the gearing, and means for adjusting said latter means whereby the load which must be imposed upon the gearing to cause any one of said automatic shifts may be changed.

10. A control mechanism for slide gear transmissions including shifter rods, arms extending from the rods and adapted to operatively engage collars of the transmission mechanism to shift the sliding gears thereof, means for manually shifting one of the rods to obtain certain settings of the transmission gearing, means for automatically returning such rod to normal position and for shifting the other rod to obtain a different speed setting, and means for automatically locking the latter rod in its shifted position.

11. In a control mechanism for transmission gearing, the combination with a transmission gearing including a drive shaft and driven shaft, a countershaft, gears upon the drive shaft, driven shaft and countershaft for transmitting power at various rates from the drive shaft to the driven shaft, a shifter rod movable in one direction to shift one of the gears to cause a low speed drive and in the opposite direction to move the same gear to cause a reverse speed drive, and a second shifter rod arranged to move another gear in one direction to cause an intermediate speed drive and in the reverse direction to cause a high speed drive, locks for the shifter rods, of means driven by the driven shaft of the transmission for causing release of the locks, an automatic reciprocation of the shifter rods to change the rate of transmission from low to intermediate, from intermediate to high, from high to intermediate, and from intermediate to low according to the load imposed upon the gearing and to reapply the locks.

12. In a control mechanism for transmission gearing, the combination with a transmission gearing including a drive shaft and driven shaft, a countershaft, gears upon the drive shaft, driven shaft and countershaft for transmitting power at various rates from the drive shaft to the driven shaft, a shifter rod movable in one direction to shift one of the gears to cause a low speed drive and in the opposite direction to move the same gear to cause a reverse speed drive, and a second shifter rod arranged to move another gear in one direction to cause an intermediate speed drive and in the reverse direction to cause a high speed drive, of a governor driven by the driven shaft of the transmission for causing an automatic reciprocation of the shifter rods to change the rate of transmission from low to intermediate, from intermediate to high, from high to intermediate and from intermediate to low according to the load imposed upon the gearing, and means for varying the resistivity of the governor whereby the load which must be imposed upon the gearing to cause any one of such automatic shifts may be varied.

13. In a control mechanism for transmission gearing, the combination with a transmission gearing including a drive shaft, a driven shaft, and means for selectively transmitting power from the drive shaft to the driven shaft at various speed ratios, of reciprocally mounted shifter rods for actuating such means, locks for the shifter rods, a clutch lever movable to connect and disconnect the drive shaft with the shaft of an engine, a governor driven by the driven shaft, and means controlled by the governor for swinging the clutch lever to disconnect the drive shaft from the engine shaft, to release the locks to cause selective reciprocation of the control rods and to reapply the locks and again swing the clutch lever to connect the drive shaft with the engine shaft.

In testimony whereof I affix my signature.

CHARLES BRITT. [L. S.]

Witness:
J. W. SULLIVAN.